United States Patent [19]

Diggs

[11] 4,204,126
[45] May 20, 1980

[54] GUIDED FLOW WIND POWER MACHINE WITH TUBULAR FANS

[76] Inventor: Richard E. Diggs, P.O. Box 776, Carthage, Mo. 64836

[21] Appl. No.: 935,504

[22] Filed: Aug. 21, 1978

Related U.S. Application Data

[63] Continuation of Ser. No. 852,054, Nov. 16, 1977, abandoned, which is a continuation of Ser. No. 624,385, Oct. 21, 1975, abandoned.

[51] Int. Cl.$^2$ ................................................. F03D 9/02
[52] U.S. Cl. ........................................ 290/55; 290/44; 415/4; 415/60
[58] Field of Search ............ 290/4 R, 4 A, 4 C, 4 D, 290/44, 55; 415/4, 60; 60/325, 398, 413, 416; 185/27-32

[56] References Cited

U.S. PATENT DOCUMENTS

| | | | |
|---|---|---|---|
| 419,345 | 1/1890 | Otto | 415/60 |
| 1,247,520 | 11/1917 | Fessenden | 290/55 |
| 1,936,233 | 11/1933 | Groves | 415/4 |
| 2,403,564 | 7/1946 | Stein | 290/44 |
| 2,688,704 | 9/1954 | Christenson | 290/4 C |

*Primary Examiner*—Gene Z. Rubinson
*Assistant Examiner*—W. E. Duncanson, Jr.
*Attorney, Agent, or Firm*—Shoemaker and Mattare, Ltd.

[57] ABSTRACT

A guided flow wind power machine having inter-meshing tubular fan blades is disclosed. The device includes a main frame which is rotatively mounted to permit it to continuously face the wind directly. The main frame carries three separate power cells each having a plurality of tubular fans, all of which are inter-connected to drive a non-linear alternating current generator. An energy storage system is also disclosed and includes a plurality of massive weights that are raised hydraulically to store excess power generated by the fans. Power is withdrawn from the storage apparatus by permitting the weights to act against the hydraulic system to drive a reversible pump-motor.

11 Claims, 7 Drawing Figures

GUIDED FLOW WIND POWER MACHINE WITH TUBULAR FANS

This is a continuation, of application Ser. No. 852,054, filed Nov. 16, 1977, which is a continuation of Ser. No. 624,385, filed Oct. 21, 1975, both abandoned.

BACKGROUND OF THE INVENTION

1. Field of the Invention

The present invention relates to an apparatus for generating electrical power from wind energy and more particularly to a guided wind flow device including inter-meshing fans.

2. Description of the Prior Arts

In modern times the search for pollution-free sources of energy that can be developed at low cost has accelerated tremendously in view of the rapidly climbing costs of conventional fossil fuels and in view of the constant threat of environmental pollution. One source of energy which is drawing renewed attention is the wind.

Many types of apparatuses have been known from ancient times which produce energy from the wind. However, in the past few if any devices of a practical nature have been developed which could permit wind energy to be transformed efficiently into more convenient sources of energy such as electrical power. Even fewer devices have been developed which had the capability of storing energy produced by the wind, a necessity for successful wind power converting apparatus due to the erratic and inconsistent properties of the winds.

One system that achieves both efficient wind power conversion and energy storage is disclosed in my co-pending application entitled "High Power Wind Turbine With Kinetic Accumulator", Ser. No. 576,984, filed May 13, 1975. However, even though the device disclosed in that application is successful for its intended purpose, further developments and innovations in wind power conversion have occurred for improving the efficiency of power conversion and storage systems. The present invention includes a number of such improvements and innovations which render wind power conversion and energy storage more efficient and more cost effective in many environments.

SUMMARY OF THE INVENTION

Accordingly, one object of this invention is to provide an improved mechanism for harnessing wind power.

Yet another object of the present invention is the provision of a novel tubular fan apparatus for converting wind energy to electrical power.

A still further object of the present invention is the provision of a novel guided flow apparatus having inter-meshing tubular fans for efficiently converting wind energy into electrical power.

Yet another object of the present invention is the provision of a novel energy storage system including a reversible hydraulic pump-motor.

Yet another object of the present invention is the provision of a wind power conversion and storage system including inter-meshing fans for generating electrical power and hydraulically elevated weights for storing the generated power.

Briefly, these and other objects of the invention are achieved by the provision of a framework carrying a plurality of power cells, each power cell carrying a bank of inter-meshing tubular fans. Pairs of inter-meshing fans are coupled together by roller chains arranged in a figure-8 pattern. All of the inter-meshing fan pairs in each energy cell are coupled to a nonlinear alternating current generator for producing constant frequency current regardless of the speed of the fans. The framework carrying all of the power cells is rotatably mounted so that it may be continuously directed to face into the wind. An energy storage system including a plurality of massive weights is provided for storing excess energy produced by the alternating current generators. The weights are elevated by a reversible hydraulic pump-motor. Power is withdrawn from the energy storage system by allowing the weights to fall against the hydraulic system thereby driving the reversible pumpmotor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
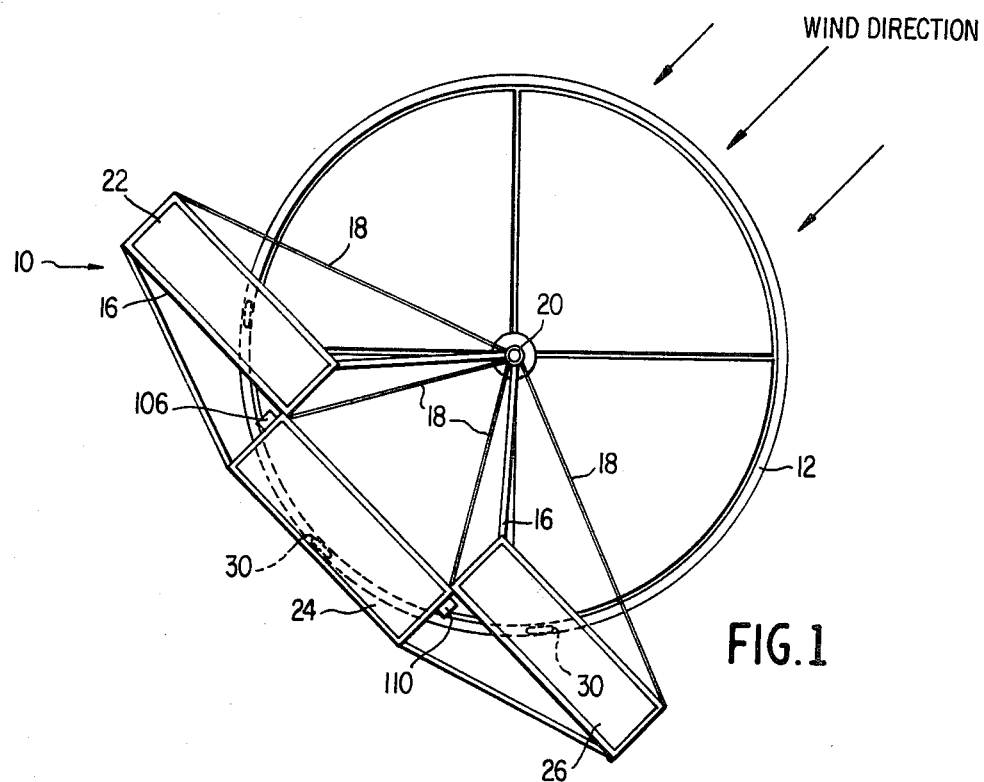
FIG. 1 is a plan view of the complete guided flow wind power assembly of the present invention.

Referring now to the drawings, wherein like reference numerals designate identical or corresponding parts throughout the several views, and more particularly to FIG. 1 thereof, the overall configuration of the apparatus of the present invention is shown as including a main frame 10 rotatively mounted on the concrete wall 12 of a pit 14.

The main frame 10 includes a network of rigid structural members 16 as well as a plurality of stabilizing cables 18 for supporting the structure against the force of high winds. The rigid structural members 16 and cables 18 are rotatably coupled to a central pivot and electrical connecting ring 20 firmly anchored in the base of the pin 14. The details of the central pivot and collecting ring 20 are clearly set forth in FIG. 8 of my co-pending application identified above. It is to be noted that the main frame 10 and pit structure 14 of the present invention may also be substantially identical to the corresponding main frame and pit structures illustrated and described in my above-identified co-pending application.

Figure 2:
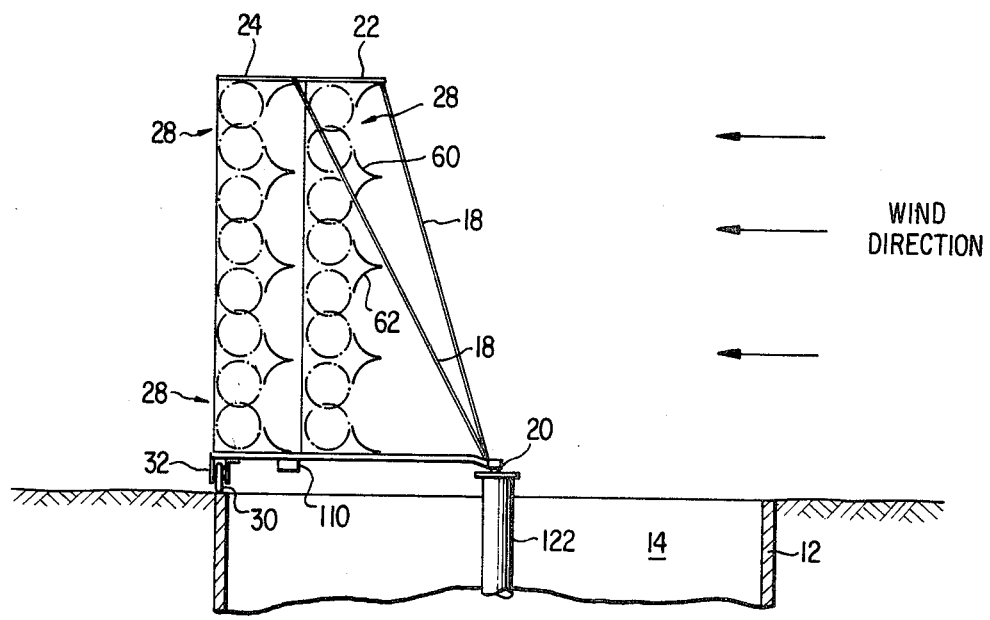
FIG. 2 is a cutaway side view of the apparatus illustrated in FIG. 1.

The main frame 10 includes a plurality of power cells 22, 24 and 26, each of which houses a plurality of pairs of inter-meshing fans 28, as shown in FIG. 2. In the embodiment of FIG. 2 four pairs of intermeshing fans are included in each of the power cells 22–26. Clearly, more or fewer pairs of fans can be included in each power cell depending upon the selected dimensions of the power cell and the diameter of the fans. In the preferred embodiment of the apparatus, the entire device illustrated in FIG. 1 is preferably about 30' wide and 20' high, and is thus capable, under favorable wind conditions, of producing between 15 and 25 hp. In accordance with these dimensions, each of the power cells 22–26 is approximately 10' wide and 20' high and each of the fans is approximately 2' in diameter and 10' in width.

Each of the power cells 22–26 is supported by a single pivotallymounted, rubber tired wheel 30. Each wheel is equipped with suitable flange members 32 for retaining it in position along the top of the pit wall 12. Similarly, each of the wheels is equipped with a suitable braking mechanism to prevent rapid oscillations of the entire assembly due to rapidly changing wind directions. The details of the wheel structures and their accompanying brake assemblies are clearly set forth in my above-identified application, and are shown in detail in FIGS. 6 and 7 of that application.

Figure 3:
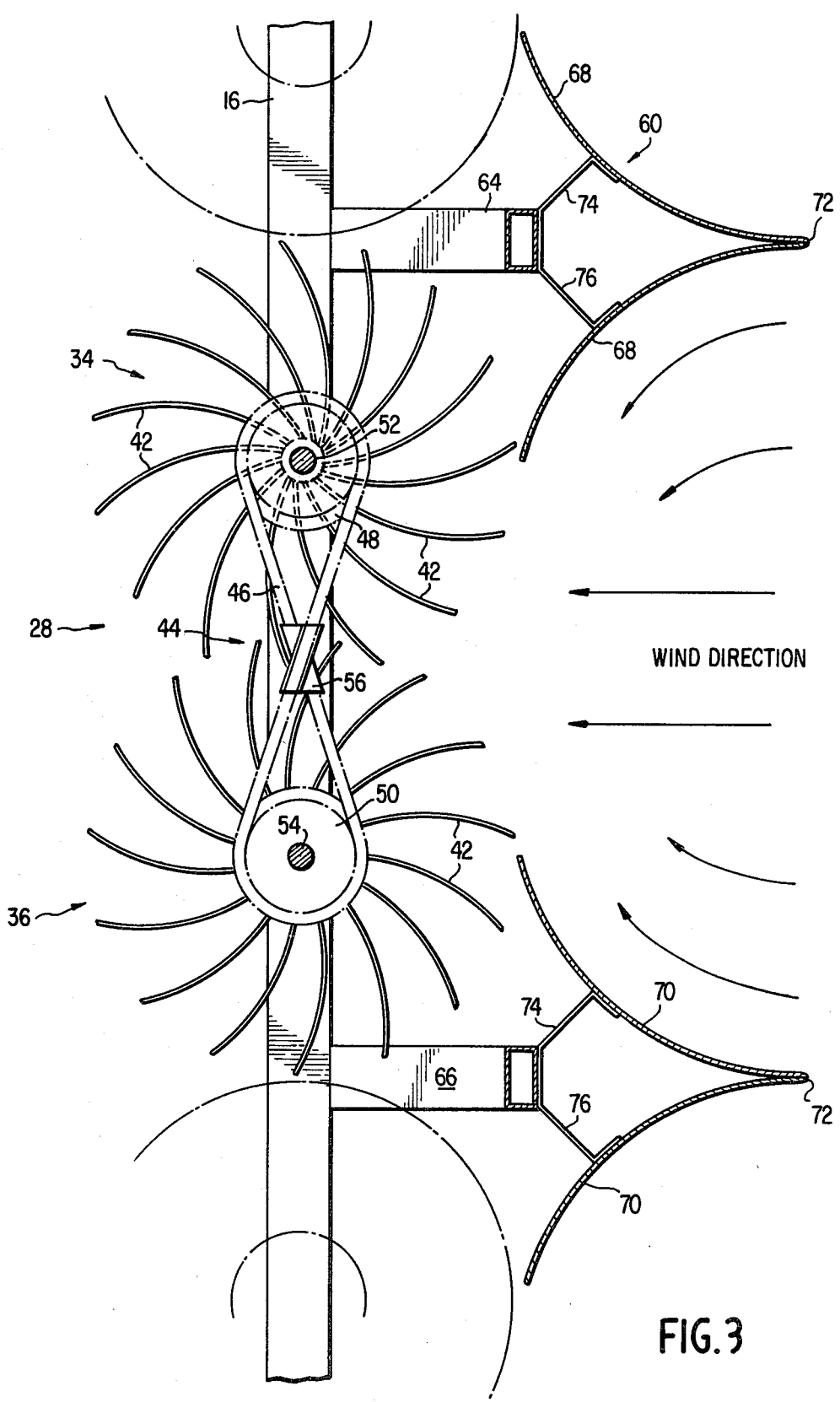
FIG. 3 is an enlarged cutaway side view of a pair of inter-meshing tubular fans showing the details of the fans and the wind guide structure.

Attention is now directed to FIG. 3 which illustrates in detail the fan and wind flow guide structures of the present invention. In particular, two inter-meshed fan wheels 34 and 36 are shown rotatively mounted by means of suitable bearing assemblies 38 and 40 (FIG. 6) respectively, to a rigid structural number 16 of the main frame 10.

Each of the inter-meshed fan wheels includes 15 curved fan blades 42 which are shaped to efficiently catch impinging wind currents. The fan blades overlap somewhat as shown at 44 to eliminate interstitial space through which wind power can escape and to thereby prevent slippage of the fan blades relative to the impinging wind stream. In order to maintain the overlapping blades in synchronism, a chain 46 arranged in a figure-8 pattern is coupled to sprockets 48 and 50 secured to each of the inter-meshed fan wheels 34 and 36, respectively, and rotatable on axle shafts 52 and 54 which also support the fan wheels. The axle shafts 52 and 54 are respectively carried by the bearing assemblies 38 and 40 which are in turn coupled to the rigid structural numbers 16.

Figure 6:
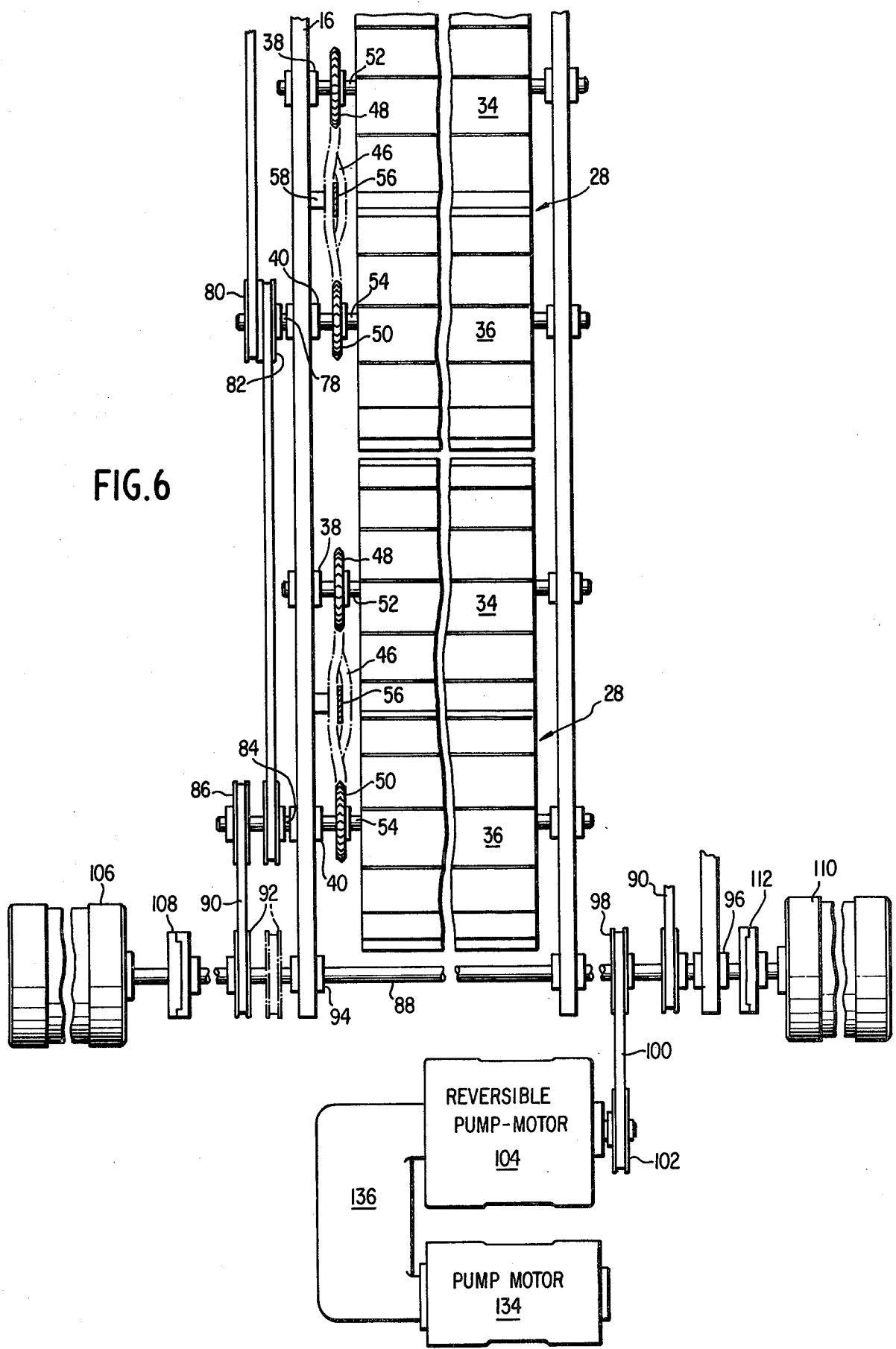
FIG. 6 is an illustration of the mechanical coupling and drive assemblies of the present invention.

The figure-8 chain drive maintains the blades of the two inter-meshed fan wheels in properly spaced relationship as the two fan wheels rotate in opposite directions. A side view of the chain and sprocket assembly is shown in FIG. 6. A chain slide 56 supported by a pedestal number 58 secured to one of the rigid structural number 16 is included to provide a cross over point for the chain to allow the chain to move in a figure-8 pattern without interference. The chain slide 56 is preferably made of teflon, teflon-coated steel or another suitable rugged material with a low coefficient of friction.

Referring again to FIG. 3, a pair of wind deflectors 60 and 62 are shown mounted to the rigid structural number 16 by means of rigid supports 64 and 66, respectively. Each of the wind deflectors includes a pair of curved deflector blades 68 and 70 which are joined together at a forward edge 72 to form a thin line of low wind resistance. The opposite end of each deflector blade is positioned adjacent the periphery of one of the fan wheels and is oriented at substantially a right angle with respect to the fan blades. This arrangement causes the impinging wind currents to be directed into the fan blades at the most efficient angle to derive maximum output power from the impinging wind currents. It will be understood that the wind deflectors are of the same length as the fan blades and are positioned between the various pairs of fan wheels to properly direct the impinging wind currents toward all of the fan wheels for maximizing their power output. The structure of each of the deflectors includes frame members 74 and 76 securing the curved deflector blades 68 and 70 to the rigid supports 64 and 66. It will be apparent to those skilled in the art that a plurality of wind deflectors are provided corresponding to the number of fan wheels. In particular, a sufficient number of deflectors must be provided so that upper and lower curved deflector blades 68 and 70 are provided for each pair of intermeshing fan wheels.

Referring now to FIG. 6, the system for inter-connecting the various fan wheels to derive output power is illustrated in more detail. Since each pair of fan wheels is inter-connected by a roller chain mechanism, as described previously, each pair of fan wheels requires only one power output shaft. Such a shaft is illustrated at 78 in FIG. 6 and represents the power output shaft for the two fan wheels 34 and 36. The power output shaft 78 is an elongated portion of the axle shaft 54 and carries a first belt sheave 80 for receiving power from upper level fan wheel pairs and a second belt sheave 82 for supplying output power to lower level fan pairs. Similar arrangements of belt sheaves are provided for inter-connecting all of the pairs of inter-measuring fan wheels in each of the power cells, 22, 24 and 26.

The lower most power output shaft of each power cell, as illustrated at 84 in FIG. 6, for example, is provided with a cell output sheave 86 which is in turn coupled to a generator drive shaft 88 by means of a suitable belt 90 and a corresponding sheave 92 secured to the generator drive shaft 88. The generator shaft is rotatively mounted by means of suitable bearing members 94 and 96 to appropriate rigid structural number 16 of the frame of the overall assembly.

It is noted that each of the sheaves 92 is provided with an internal overrunning clutch so that the generator shaft may be driven at a higher speed than the sheaves 92, when required. Similarly, a sheave 98 coupled by means of a belt 100 to the output sheave 102 of a reversible pump-motor 104 is also equipped with an internal overrunning clutch. The purpose of the overrunning clutches is to permit the fan assembly to drive the generator shaft without need for driving the reversible pump-motor, and similarly to permit the reversible pump-motor to drive the generator shaft without need for turning the entire fan assembly. Accordingly, the generator shaft will be rotated by whichever input power mechanism is rotating most rapidly.

A main generator 106 is coupled to the generator drive shaft 88 through a conventional normally engaged mechanical clutch 108. An auxiliary generator 110 is coupled to the generator drive shaft 88 through a magnetic clutch 112 which is controlled in response to the ouput of main generator 106, as will be explained in more detail subsequently. The main and auxiliary generators are both non-linear generators that produce 60 cycle current regardless of the speed at which they are run. Thus the rotating speed of the generator drive shaft determines only the total output power delivered by the generators and does not change the frequency of the output power.

Figure 4:
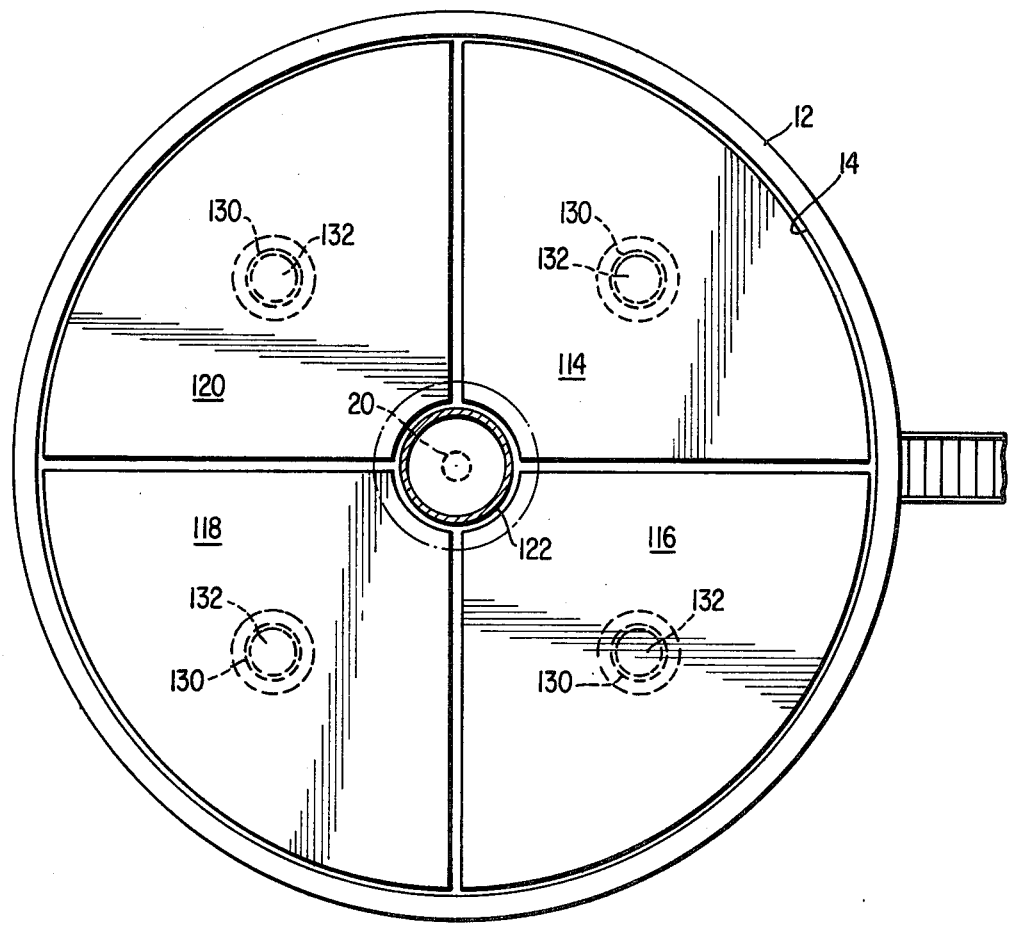
FIG. 4 is a plan view of the hydraulic energy storage apparatus of the present invention.
Figure 5:
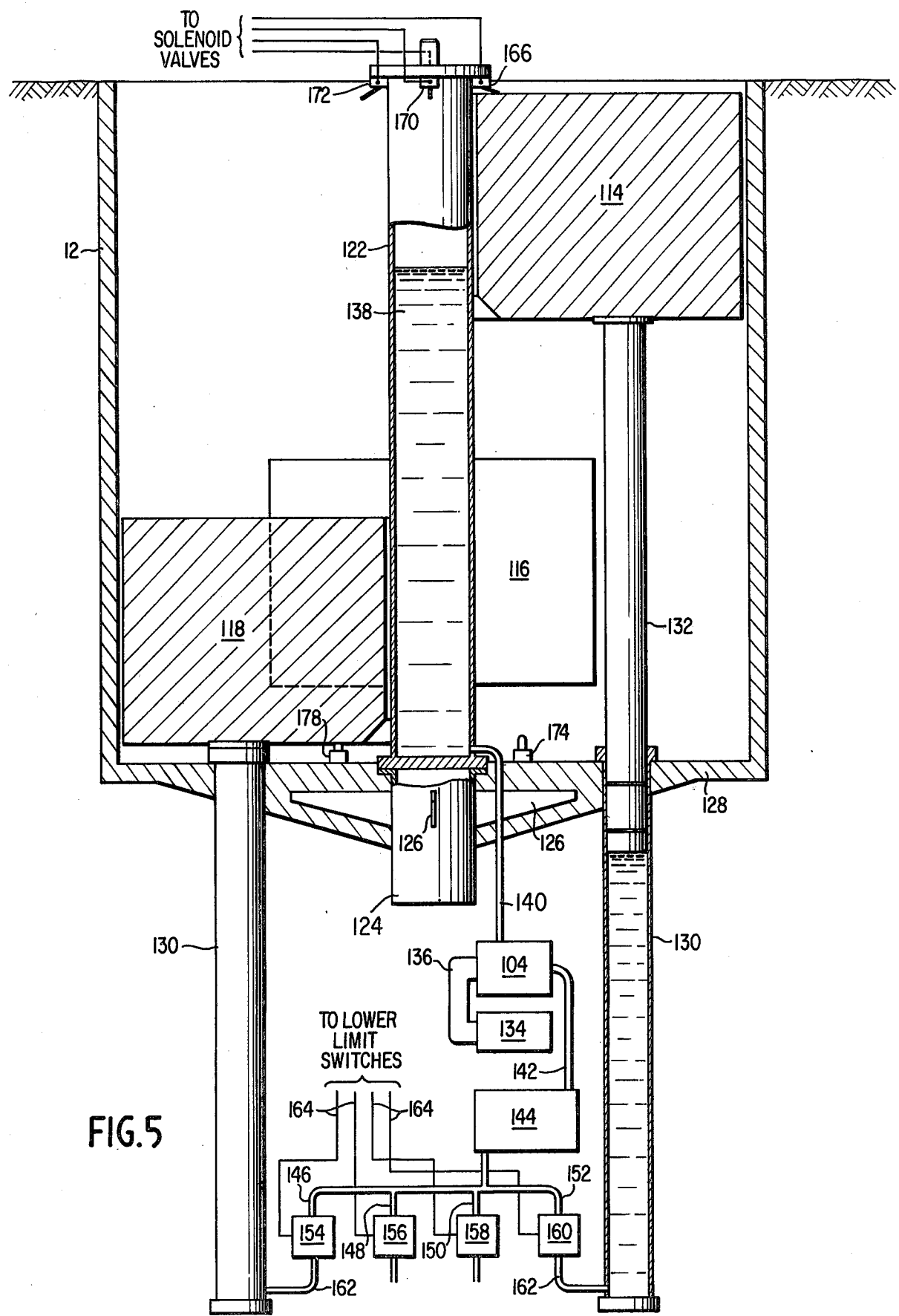
FIG. 5 is a cutaway side view of the hydraulic energy storage apparatus shown in FIG. 4.

Attention is now directed to FIGS. 4 and 5 illustrating the hydraulic energy storage system of the present invention. More particularly, as shown in FIG. 4, the pit 14, above which the previously described generating fans are mounted, houses four massive weights 114, 116, 118 and 120, each having the shape of one quarter of a circle. At the center of the weights is positioned the central pivot 20 about which the main frame of the fan assembly rotates, as previously described. The central pivot 20 is mounted above a cylindrical column 122 which provides sufficient structural strength to support the central pivot 20 and also acts as an oil reservoir for an hydraulic weight elevating system to be described subsequently. The cylindrical column 122 includes a solid base portion 124 having radiating arms 126 secured thereto for stabilizing the cylindrical column 122. The base 124 along with the arms 126 are cast into a concrete mass 128 forming the bottom surface of the pit 14.

Referring now to FIG. 5, the hydraulic lifting mechanism of the energy storing weights 114 through 120 is illustrated in more detail. In particular, an hydraulic cylinder 130 is sunk into the ground beneath the center of mass of each of the energy storing weights. An hydraulic piston 132 is secured to the base of each of the weights and interfits in the conventional manner with each of the hydraulic cylinders 130 so that the weights can be raised by hydraulic pressure exerted within the cylinders at the bottom surfaces of each of the pistons.

Although the present invention is not limited by scale in any manner, some exemplary dimensions are provided to illustrate the power storing capacity of a typical device. The weights 114 through 118 may be 750,000 pounds each, for a combined total weight of 1,500 tons. The length of the pistons 132 is sufficient to permit the weights to be lifted 10', thereby providing for energy storage of 900 hp. The pistons 132 should be approximately 30" in diameter requiring approximately 2,500 pounds per square inch of pressure to lift weights of the described magnitude. The interior dimensions of the pit wall 12, assuming the pit wall and the weights are made of reinforced concrete is approximately 40' in diameter and the central cylindrical column 122, which provides the hydraulic fluid reservoir, is approximately 60" in diameter.

The hydraulic system includes the reversible pump-motor 104 previously mentioned. This device, which is conventional and commercially available is driven by an electric motor 134 through a gear drive 136 (see FIG. 6). The reversible pump-motor 104 is coupled to a quantity of conventional hydraulic fluid 138 stored within the central column 122 by means of a main hydraulic fliud line 140. A main output line 142 delivers the output of the pump-motor 104 to a buffer reservoir 144 which is in turn coupled by a plurality of hydraulic lines 146, 148, 150 and 152 to a corresponding plurality of solenoid valves 154, 156, 158 and 160. The solenoid valves are each coupled to the base of a cylinder 130 by means of a hydraulic fluid line 162. The solenoid valves are coupled via electrical leads 164 to four limit switches 166, 168, 170 and 172 positioned adjacent the top of the cylindrical column 122 and establishing the maximum limit of travel for the weights 114 through 120. Thus movement of the weights to their maximum height results in actuation of the limit switches and accordingly controls the solenoid valves.

When power is to be stored in the storage system illustrated in FIGS. 4 and 5, the resersible pump-motor 104 is operated in its forward direction as a hydraulic pump. Thus, the motor 134 is energized to drive the pump 104 through the gear drive 136 to draw hydraulic fluid through the main hydraulic line 140 from the fluid reservoir 138 and pumps the hydraulic fluid under high pressure over the main output line 142 to the buffer resevoir 144, where the hydraulic pressure is distributed to the solenoid valves 154–160. Of these solenoid valves, only the first valve 154 is normally in the open state. This valve thus supplies pressurized hydraulic fluid to the cylinder 130 associated with the first weight 114, causing this weight to be elevated by the hydraulic fluid to store energy.

When the weight 114 is elevated to its maximum height it actuates the corresponding limit switch 166 causing solenoid valve 154 to be closed, retaining weight 114 in its upper most position, and opening solenoid valve 156 to direct the supply of hydraulic fluid from the pump-motor 104 to the cylinder associated with the next weight. This process continues until all weights are elevated to their maximum height, at which time any further energy to be stored must be transferred to an additional storage facility.

When energy is to be withdrawn from the system the motor 134 is switched off and the gear train 136, which includes an overrunning clutch, permits the pump-motor 104 to be driven in reverse by the stored potential energy of the weights acting through the hydraulic system. The solenoid valve of the last weight to which energy is supplied remains open, and thus permits hydraulic pressure to be applied to the reversible pump-motor initially. When that weight reaches its lower most position, it activates one of a plurality of lower limit switches 174 causing the next sequential solenoid valve to be opened to continue supplying output hydraulic power to the pump-motor 104, whereby the generator drive shaft 88 is driven to supply necessary output power.

Figure 7:
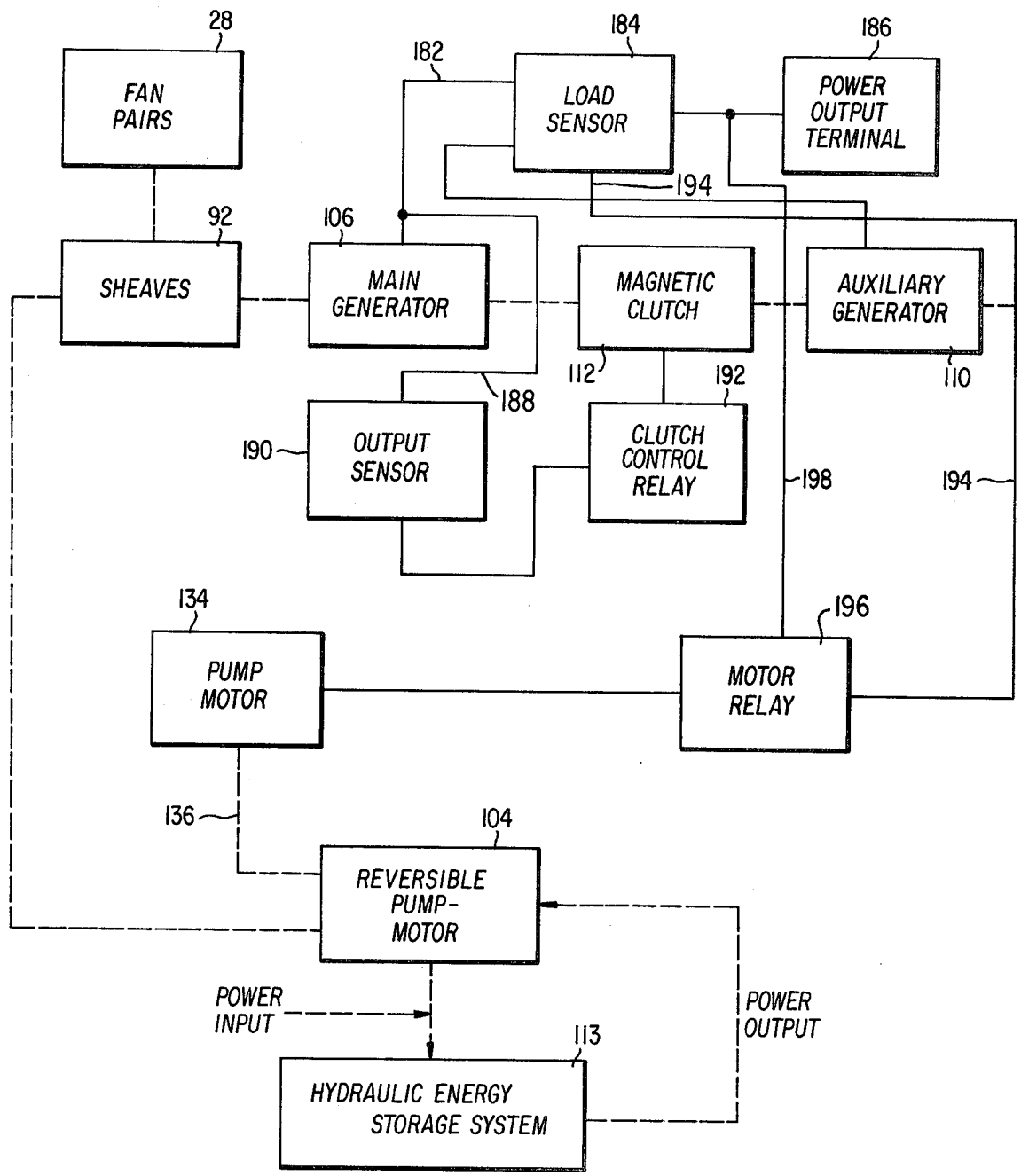
FIG. 7 is a block diagram illustrating the electrical control system of the present invention.

Referring now to FIG. 7, a block diagram of the overall system of the present invention is shown. Assuming that a relatively light breeze exists, the fan pairs 28 are initially rotated at a relatively low speed and drive main generator 106 through sheaves 92. The output of the main generator 106 is supplied through an output line 182 and a load sensor 184 to a power output terminal 186 at which load power is delivered. The output of the main generator 106 is monitored via a line 188 which is coupled to an output sensor 190 for monitoring the power output of the main generator. When the power output of the main generator is below its maximum level, the output sensor, which may constitute a power level operated relay, provides no output. However, when the output of the main generator exceeds its rated maximum, the output sensor generates a signal which actuates a clutch control relay 192 for engaging magnetic clutch 112, whereby auxiliary generator 110 is coupled to the fan pairs for supplying additional output power. The need for the auxiliary generator would presumably indicate a freshening of the wind to a relatively strong breeze.

The load sensor 184 compares the output power drawn by the load with the power supplied by the generators 106 and 110. If the load has the capability of drawing more power than is supplied by the generators, the load sensor remains inactive. However, if the power supplied by the generators exceeds that required by the load, the load sensor delivers an output signal over line 194 to trigger motor relay 196 which couples a power supply line 198 to pump-motor 134 for driving the reversible pump-motor causing it to raise the previously described weights in the energy storage system for storing the excess power generated by the fans. The energy storage system operates in the manner described above to store excess energy and to deliver the stored energy to the generator assembly when required.

Although the apparatus of the invention has been illustrated and described as including overrunning clutches in the sheaves 92 and 98 so that the generators 106 and 110 can be driven by the reversible pump-motor 104 to provide output power, another arrangement of the invention is also contemplated. The overruning clutches may be eliminated, and output electric power may be taken directly from the motor 134 driven in reverse in a generator mode by the reversible pump-motor 104. Power can simultaneously be taken from the generators 106 and 110 to provide a maximum output power which is greater than the power individually producible by the generators 106 and 110 or the energy storage system.

Accordingly, the present invention provides an efficient, pollution-free system for generating electricl power from wind energy and also provides the unique system for storing the generated energy.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. An apparatus for converting wind energy to electric power and for selectively storing excess electric power comprising:
    a rotatable main frame assembly;
    a plurality of power cells secured to said main frame assembly, each said power cell including a plurality of pairs of intermeshing fan wheels;
    power train means connected to said pairs of fan wheels;
    electrical generator means coupled to said power train means for generating electrical power;
    a power storage system coupled to said electrical generator means for selectively storing excess power generated thereby;
    wherein said power storage system comprises a plurality of massive weights, an hydraulic system for elevating said weights and reversible pump-motor means coupled to said hydraulic system and to said electrical generator means for raising said weights to store energy and for driving said electrical generator means to utilize stored energy; and
    wherein said hydraulic systrm further comprises an hydraulic cylinder, connected to each of said weights, surrounding each of a plurality of pistons and hydraulic circuit means coupling said hydraulic cylinders with said reversible pump-motor including a buffer reservoir and a plurality of solenoid valve means for selectively coupling said buffer reservoir with each of said hydraulic cylinders.

2. An apparatus as in claim 1, further comprising:
    a pit having a concrete wall and a concrete floor, said power storage system mounted within said pit; and
    a pivot and support member mounted in said floor of said pit and extending to the top of said pit wall, said main frame assembly movable mounted on said pit wall and said pivot and support member.

3. An apparatus as in claim 1, further comprising:
    a plurality of wind deflector means secured to said power cells adjacent said pairs of fan wheels for efficiently directing wind energy into said fan wheels.

4. An apparatus for converting wind energy to electric power and for selectively storing excess electric power according to claim 1, in which said generator means further comprises:
    non-linear generator means for generating constant frequency output power independent of the speed at which said non-linear generator means is driven.

5. An apparatus as in claim 4, wherein said non-linear generator means comprises:
    a plurality of non-linear generators;
    a drive shaft coupled to said power train for driving at least one of said plurality of non-linear generators;
    a magnetic clutch coupled to said drive shaft and to at least a second one of said plurality of non-linear generators to permit selective engagement and disengagement thereof.

6. An apparatus as in claim 1, wherein said power train includes:
    roller chains arranged in a figure-eight pattern interconnecting said pairs of fan wheels;
    belt means coupling said interconnected fan wheels with said electrical generator means; and
    belt means interconnecting adjacent pairs of fan wheels.

7. An apparatus as in claim 6, wherein said power train further comprises:
    belt means interconnecting adjacent pairs of fan wheels.

8. An apparatus as in claim 6, wherein said power train further comprises:
    belt means coupling said interconnected fan wheels with said electrical generator means.

9. An apparatus as in claim 1, further comprising:
    a control system coupled to said electrical generator means and to said power storage system for regulating in accordance with load demand the supply of power delivered to said power storage system.

10. An apparatus as in claim 9, further comprising:
    a plurality of limit switches coupled to said solenoid valve means for controlling said solenoid valve means in response to movements of said weights.

11. An apparatus for converting wind energy to electric power and for selectively storing excess electric power comprising:
    a rotatable main frame assembly;
    a plurality of power cells secured to said main frame assembly, each said power cell including a plurality of pairs of intermeshing fan wheels;
    power train means connected to said pairs of fan wheels;
    electrical generator means coupled to said power train means for generating electrical power;
    a power storage system coupled to said electrical generator means for selectively storing excess power generated thereby;
    wherein said power storage system comprises a plurality of massive weights, an hydraulic system for elevating said weights and reversible pump-motor means coupled to said hydraulic system and to said electrical generator means for raising said weights to store energy and for driving said electrical generator means to utilize stored energy; and a control system coupled to said electrical generator means and to said power storage system for regulating the supply of power delievered to said power storage system which includes load power sensing means for sensing the power drawn by a load coupled to said electrical generator means; and motor relay means coupled to said load power sensing means for energizing said reversible pump-motor in response to a control signal from said load power sensing means.

* * * * *